United States Patent [19]

O'Maley

[11] 4,039,768
[45] Aug. 2, 1977

[54] PAY TELEPHONE STATION MONITOR SYSTEM

[76] Inventor: James B. O'Maley, 2741 NE. 36th St., Lighthouse Point, Fla. 33064

[21] Appl. No.: 690,286

[22] Filed: May 26, 1976

[51] Int. Cl.² .......................................... H04M 1/24
[52] U.S. Cl. ........................... 179/175.2 C; 179/6.3 R
[58] Field of Search ................. 179/175.2 C, 175.3 R, 179/175, 6.3 R, 6.4, 6.5; 340/280, 421

[56] References Cited

U.S. PATENT DOCUMENTS

| | | | |
|---|---|---|---|
| 3,161,731 | 12/1964 | Seeley | 179/175.1 R |
| 3,449,524 | 6/1969 | Pharis | 179/6.3 R |
| 3,496,300 | 2/1970 | Stokes | 179/175 |
| 3,793,490 | 2/1974 | Karras | 179/175.2 C |
| 3,813,500 | 5/1974 | Roberts | 179/175.3 R |
| 3,829,618 | 8/1974 | Brandon | 179/175.2 C |

Primary Examiner—Douglas W. Olms
Attorney, Agent, or Firm—Bauer, Amer & King

[57] ABSTRACT

A pay telephone station monitor system which monitors the operation of a pay telephone station and detects malfunction of the pay station equipment. An alarm signal is produced upon detection of such malfunction which signal is transmitted to a central office to produce a visual output display upon predetermined occurrences of the alarm signals. The monitor system senses the impedances of the transmitter and receiver elements in the handset of the telephone, the time delay between removing the handset from the cradle and the occurrence of dial tone, and the delay between the onset of dial tone and dial tone break. The central office equipment produces a hierarchy of visual indications indicative of the number of times faults have occurred, and also gives a time reading since the occurrence of an initial fault or since the last successful use of the pay station. A coin box monitor can also be included to detect the height of coins in a coin box and transmit a signal to the central office when a predetermined height has been reached.

27 Claims, 3 Drawing Figures

PAY STATION EQUIPMENT

PAY TELEPHONE STATION MONITOR SYSTEM

BACKGROUND OF THE INVENTION

This invention relates to telephone monitoring equipment and, more particularly, to a system which monitors the proper functioning of a telephone pay station.

Most telephone companies provide pay telephone stations at various locations throughout an area being covered.

Such pay stations are available for public use but are, generally, not regularly monitored by the telephone companies. Because of their availability and access to the public, they are frequent objects of vandalism and neglect. They are also subject to the hazards of environmental conditions which severely effect the pay telephone equipment and often prevent its proper functioning. In addition, malfunctions may occur directly due to equipment failure because of internal components or service difficulties.

When a pay telephone station is inoperative, the telephone company is financially damaged since they cannot receive the normal revenue from the use of such phone. The public is also harmed by not having the availability of a phone in that area. At present, most companies depend upon customer reporting of the malfunction of telephone pay stations. However, this has been found to be most inefficient. Many customers, when they find the pay station inoperative, will simply move on to the next pay phone and never report the difficulty. One telephone system has found this problem of such aggravation that they have embarked upon a program referred to as "take five" in which they encourage their employees to check our five pay stations each day on their way to or from work.

SUMMARY OF THE INVENTION

It is accordingly an object of the present invention to provide a pay station monitoring system which avoids the aforementioned problems.

A further object of the present invention is to provide a pay station monitoring circuit which can be connected at a pay telephone station and wich transmits alarm signals onto the telephone line to be received at the central office, the signals being indicative of the malfunction of the pay telephone station.

Still another object of the present invention is to provide a pay station monitor system which detects the malfunction of the equipment, including changes in impedance of the transmitter and/or receiver elements, excessive delay in the onset of dial tone following seizure of the line, and excessive delay between the onset and the break of the dial tone signal.

Yet a further object of the present invention is to provide a pay telephone station monitor system which monitors the height of the coins in the coin box of the telephone station and generates a signal onto the telephone line indicating that a predetermined height has been reached.

A further object of the present invention is to provide a pay telephone station monitor system which includes equipment at the central office to provide visual indications of predetermined occurrences of malfunctions of the pay station equipment.

Yet a further object of the present invention is to provide a pay telephone station monitor system which includes equipment at the central office providing visual indications of the number of times that a malfunction has occurred at a pay telephone station.

Yet a further object of the present invention is to provide a pay telephone station monitor system which includes equipment at the central office which indicates the time interval which occurred since a previous successful telephone call has been made, as well as the time interval since a first malfunction has been reported at the pay station.

Yet a further object of the present invention is to provide a pay telephone station monitor system which operates on rechargable batteries which are continuously recharged by a trickle charge circuit operated from the power on the telephone lines.

Another object of the present invention is to provide a pay telephone station monitor system which is efficient in operation, simple to utilize, readily installed, and easy to service.

These objects are achieved in accordance with a preferred embodiment of the present invention wherein there is provided a pay telephone station monitor system comprising detection circuit means connected at the pay telephone station for producing alarm signals upon the detection of malfunction of the pay station equipment. A monitor circuit means is also connected at the central office for receiving the alarm signals and producing output signals upon predetermined occurrences of the alarm signals.

The detection circuit means includes checking means for measuring the impedance of the transmitter and receiver elements in the pay telephone station and producing an alarm signals when their impedances differ from predetermined values. A first timing means is also included for timing the interval from handset removal to the onset of dial tone and producing an alarm signal when the interval is greater than a predetermined amount. A second timing means is also included for timing the interval from the onset of the dial tone to the breaking of the dial tone and producing an alarm signal when the interval is greater than a predetermined amount. The detection circuitry is energized by a source of energy. A switching means is activated when the handset is removed from the cradle which interconnects the detection circuit to the source of energy. A further timing means is provided for timing a predetermined interval commencing with the removal of the handset from the cradle and disconnecting the detecting circuits from the source of energy at the end of that interval. The alarm signal is produced by means of an oscillator which places a signal on the line whose frequency will not interfere with the telephone equipment.

At the central station the monitor circuit includes display means for producing an indentifiably different output signal for each one of a successive number of alarm signals received. In addition, when a successful call has been completed on the pay station, a sensing means at the central station detects such successful call and produces a reset signal which clears all of the previously registered output signals produced for that station. In order to ensure that a telephone has not been vandalized after a successful call, or has not been neglected after such vandalism, a timing means is included at the central station for recording the interval of time since a pay station has been previously used and produces an output signal upon a predetermined interval.

In a further embodiment of the invention, the detection circuit means at the pay station includes a coin box monitor which detects the height of the coins in the coin box and produces an alarm signal when a predetermined height is reached. Corresponding circuitry in the central office station detects such signal and produces a visual signal indication of a coin box near-full condition.

BRIEF DESCRIPTION OF THE DRAWINGS

Other objects and many of the attendant advantages of the present invention will be readily appreciated and better understood by reference to the following detailed description when considered in connection with the accompanying drawing in which like reference numerals designate like parts throughout the figures thereof and wherein.

DESCRIPTION OF THE PREFERRED EMBODIMENTS

The pay telephone station monitor system to be described is utilized on a pay telephone station having the usual telephone equipment including a telephone handset, which has transmitter and receiver elements and normal telephone circuits. These are connected by means of the telephone line to a central office through which dial tone signals and telephone calls can be transmitted and received. Part of the monitor system is connected at the pay telephone station to detect the various faults and malfunctions of the pay telephone station and in response thereto transmit a signal onto the telephone line which is received by additional equipment installed at the central office. The equipment at the central office produces visual output warning signals in response to the occurrence of various malfunctions.

Figure 1:
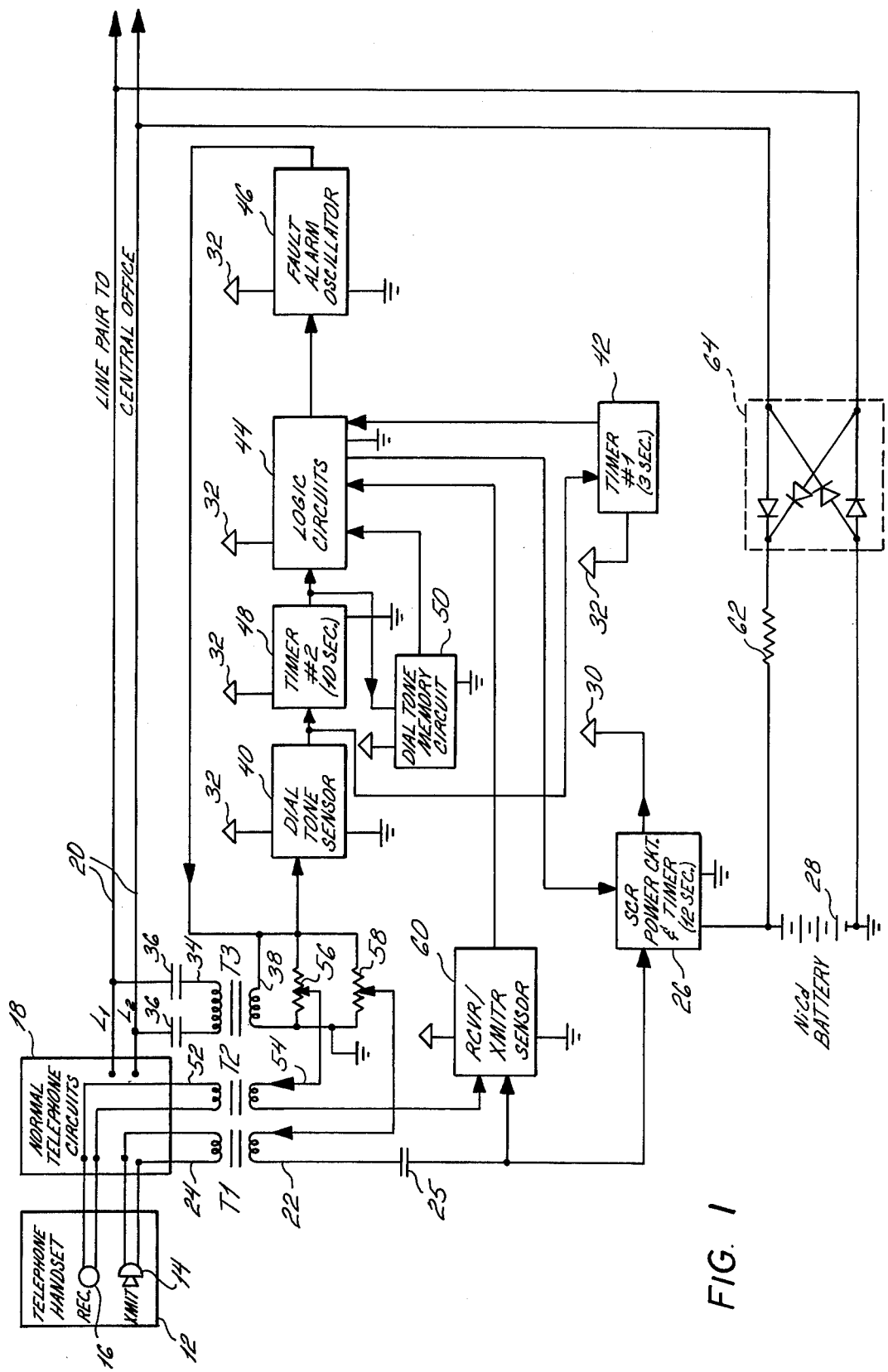
FIG. 1 is a circuit diagram of a part of the pay telephone station monitoring system and specifically the equipment connected at the pay telephone station.

Referring now to FIG. 1 there is shown the equipment attached at the pay telephone station. A telephone handset unit 12 includes a transmitter or microphone 14 and a receiver 16. The handset can be lifted off a cradle which is connected to a normal telephone circuit 18 which interconnects to the lines 20 referred to as L1 and L2, connected to the central office. When the handset is taken off the cradle, a trigger pulse is generated at the seecondary 22 of the transformer T1. This transformer has its primary 24 connected directly across the transmitter 14 of the handset. When the phone is taken off hook the trigger pulse is generated at the output of the transformer from DC flow in the primary. By means of the capacitor 25, the pulse is transmitted to an SCR circuit and unijunction timer 26. This pulses the SCR to switch ON, which interconnects a power source, shown as the nickle cadmium battery 28, into the circuit and applies the voltage at its output 30. The voltage is applied at each of the terminals 32 to energize the various circuit components of the system.

Transformer T3 has its primary 34 connected directly across the telephone line 20 by means of the capacitors 36. Dial tone signals appearing on the line pair L1, L2 are coupled through transformer T3 and its secondary 38 to the dial tone sensor circuit 40. Circuit 40 is a frequency and amplitude selective circuit. It is adjusted to respond to a particular frequency signal present in the incoming dial tone. Being highly selective, it does not respond to other signals, such as speech or audio, which may be present on the line. Typically, it is adjusted for 350 Hz.

A first timer 42 is activated upon application of the power as received from the SCR power circuit at 32. This timer is normally set for a first predetermined period, in this example 3 seconds. This timer continues to time the interval until it receives a stop timing signal from the dial tone sensor 40. Should it reach its predetermined timing count, it produces an output which is sent to the logic circuit 44 which controls the operation of fault alarm oscillator 46. The oscillator generates a signal which is sent onto the telephone line through the transformer T3. The frequency and amplitude is set so as not to interfere with the normal operation of the telephone system. Typically, the frequency is between the range of 1800 and 2400 Hz. In the example selected, frequency was chosen as 2000 Hz.

A second timer 48 is set to time a second interval, in this case chosen as 10 seconds. Timer 48 is activated by the dial tone sensor 40 and continues timing so long as dial tone is present on the line as detected by the sensor 40. Should it reach its predetermined output count of 10 seconds, it triggers the logic circuit 44 to cause the fault alarm oscillator 46 to generate an alarm signal which is transmitted onto the telephone line pair L1, L2.

When the handset is removed from the cradle, the SCR is powered and the timer 42 begins timing. If dial tone is sensed by the dial tone sensor 40 within the first predetermined time interval of 3 seconds, timer 42 will not cause the logic circuit 44 to trigger the alarm signal 46. When dial tone is sensed, timer 48 is triggered. If the dial tone is broken by means of dialing a number within the ten-second period, then again no alarm signal will be triggered.

Although a separate timer 42 has been shown, it is possible to directly build in a timing circuit into the logic circuit 44 itself. In this way, as soon as the power is turned ON, the timer in the logic circuit is preset for a three-second interval. When the power is turned ON, the logic circuit begins timing. If dial tone is sensed by the dial tone sensor 40, timer 48 will begin timing, which will inhibit the logic circuit 44 from triggering the false alarm. If dial tone is not received within the three-second interval, the logic circuit 44 will automaticallly trigger the alarm oscillator 46. Once dial tone is received, the ten-second interval is timed during which dial tone is to be broken. Should it not be broken, the logic circuit 44 will again automatically trigger the fault alarm oscillator 46. The output of the timer 48 also feeds a dial tone memory circuit 50. The purpose of this circuit is as follows: If the dial tone has been received and was subsequently broken, the fact that dial tone was received is stored in the memory 50. The memory circuit then supplies the logic circuit 44 with a dial tone received indication. This indication permits the logic circuit 44 to be subsequently triggered by the timer 48 if the dial tone is not broken. If, on the other hand, dial tone was received and broken within the 10 seconds, no alarm is generated.

Transformer T2 has its primary 52 directly connected across the receiver element 16 of the handset 12. The secondary 54 is connected as part of a bridge circuit including the potentiometers 56 and 58. The transformers T1 and T2 are therefore connected directly across the transmitter and receiver elements of the handset, respectively. These connections are normally made inside of the main body of the pay telephone station unit on a junction block where the transmitter and receiver cables terminate. The outputs of the transformers T1 and T2 are each connected in the bridge circuit arrrangement with the potentiometers 56 and 58, respectively. The potentiometers are fed dial tone signals from the secondary 38 of the transformer T3. Dial tone is also normally developed across the T1 and T2 secondaries, 22 and 54, respectively. The transformers T1 and T2 are connected so that the dial tone signals appearing on the secondaries are phase opposed to the signals derived from T3. Each potentiometer is then adjusted to provide a null signal for normal circuit impedance of the handset elements. These signals are then fed into a mixer circuit through the receiver/transmitter sensor unit 60. The receiver/transmitter sensor circuit 60 is a frequency and amplitude selective circuit. The frequency is adjusted to correspond to the dial tone frequency, or one of the dial tone frequency components if multiple dial tone frequencies are used. It is similar to the dial tone sensor 40, and in the example selected is adjusted to 350Hz.

If the resistance or impedance of either or both the handset elements is altered and deviates from the predetermined standard accepted values, the amplitude of the signal at the receiver/transmitter sensor 60 will increase above the normal level, and if the change is significant, it will exceed the threshold level for which the receiver/transmitter sensor has been set. This will provide an output from the sensor circuit 60 which is fed to the logic circuit 44, in turn will trigger the fault alarm oscillator 46.

The power source is shown to be a nickle-cadmium battery which is normally continuously charged by a trickle charge directly from the telephone line pair 20 through the resistor 62. The charging current, on the order of 1 or 2 milliamperes is virtually negligible in terms of the drain onto the telephone line. As the telephone is lifted off its cradle, the SCR will be triggered ON. This takes power directly from the nickle-cadmium battery and applies it to the rest of the fault detection circuitry. A unijunction circuit, included in the unit 26, is preset at a time interval, typically 12 seconds. As a result, approximately 2 seconds after all of the timers in the circuitry have checked the telephone equipment, the power will be disconnected from the detection circuitry. This permits at least a two second fault tone signal to be transmitted onto the telephone line if dial tone has not been properly broken. Of course, should other faults be detected, such as improper impedance or improper dial tone appearing on the line, a much longer tone will be generated. Once the timer 26 turns off the power, the power remains off until triggered on again by a subsequent usage of the telephone.

The connection of the fault alarm system to the telephone line pair does not impair the normal function of the telephone or the telephone system. The circuits are designed so as to present a negligible load to the system. The battery 28 being recharged from the line has the voltage passed across a rectifier bridge circuit 64. The bridge insures proper polarity of the voltage to the battery regardless of the polarity on the line pair 20. Of course, a non-rechargable battery may also be used, or the system can be poweredd directly from the telephone line.

Figure 2:
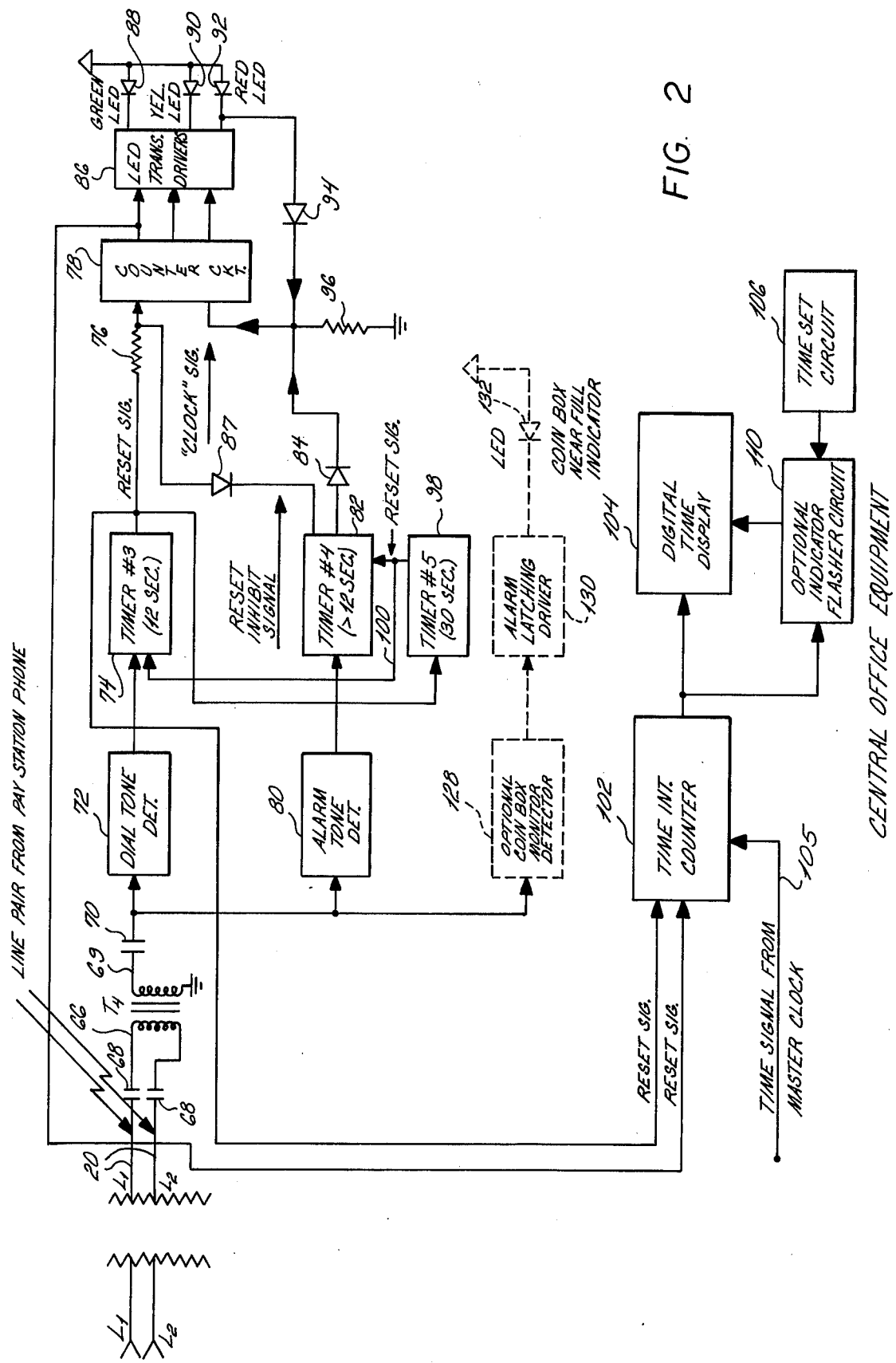
FIG. 2 is a circuit drawing of a part of the pay telephone station monitoring system and specifically the circuits connected at the central office.

Referring now to FIG. 2, there is shown the equipment which is connected at the central office to monitor the detection circuitry at the pay telephone station. The transformer T4 has its primary 66 directly connected to the line pair 20 shown as L1, L2. Capacitors 68 are inserted in the primary circuit. The secondary of the transformer 69 passes the signal through capacitor 70 to two detector circuits. The first, a dial tone detector 72 is set to sense the dial tone appearing on the line. It is a frequency and amplitude selective circuit similar to that used in the pay station equipment itself. Dial tone detector 72 triggers a third timer 74 preset to count a predetermined interval, in this example 12 seconds. The output of timer 74 is used to feed a reset signal through capacitor 76 to a counter circuit 78.

The secondary of the transformer 68 also feeds an alarm tone detector 80 which triggers a fourth timer 82 which times a period greater than the timer 74, in this case greater than 12 seconds. Timer 82 has two outputs; one of which feeds directly a clock signal via the diode 84 to the counter 78. The other via reverse diode 87 provides a reset-inhibit signal preventing the reset signal from the timer 74 from acting upon the counter 78.

If a fault alarm tone is received, the timer 82 will cause one count to be registered in the counter unit 78. As the same time, the timer 82 inhibits reset of the counter unit 78 by inhibiting the reset signal from the timer 74. If, however, the timer 82 is not activated and the 12 second interval counted by timer 74 is reached, timer 74 produces a reset signal resetting the counter to zero. In other words, if no fault is detected, and dial tone appears on the telephone line, timer 74 is triggered which resets the timer to zero. If the counter is already at zero count, the reset signal has no effect. If, however, an alarm tone is received after the dial tone has been received, timer 82 will register a count in the counter unit 78 and simultaneously inhibit any possible resetting of the counter.

If the period of count of timer 82 is greater than that of timer 74, timer 74 will have recovered to normal and can no longer reset the counter until again activated.

The output of the counter 78 is connected through transistor drivers 86 to various light emitting diodes. The diodes are utilized to indicate a sequence of fault alarm signals received. The counter is shown connected to three LED's serving as fault indicators. The first LED 88 is a green indicator and is turned on when the counter contains a first count. The second indicator 90 is shown as a yellow LED and illuminates when a second count is in the counter. The third indicator is a red LED 92 which illuminates at a third count. Additional fault alarms beyond the three count cause no further action, and the red LED will remain lighted. This is achieved by utilizing a latch circuit including diode 94 from the three output back into the clock input of the counter causing it to latch on a count of three. The resistor 96 couples the feedback circuit to ground.

If any fault alarm signal is received and registered by the counter, and subsequently a normal call is made, the timer 74 immediately resets the counter to zero and, in effect, erases all previous alarm indications.

A fifth timer 98 is adjusted at a longer time interval, in this case set at 30 seconds. Its function is simply to prevent registration of any further faults, or initiation of any reset signals for a short period immediately after the monitor system has been activated. This timer is triggered ON after the timing interval of timer 74. It is included to prevent any excessive or false registration of faults due to the customer at the pay station jiggling the switch hook. Customers frequently jiggle the switch hook if the phone fails to operate properly. By means of the output on line 100, it prevents the further registration of any signals typically for a period of 30 seconds after a first condition has been registered.

A time interval counter 102 is also included and is reset to zero count by either the reset pulse output of the clock 74′ or by the counter 78 being reset to zero by its registering a green fault, indicating a first occurrence of a malfunction. Timer 102 has its output time displayed on a digital display 104. The display can be, by way of example, 7 segment number displays having two digits. Pulses are fed to the timing counter 102 from a master clock (not shown) along line 105. The master clock is generally included in the central office equipment. The display 104 will indicate elapsed time from zero to 99 hours. By means of a time-preset circuit 106, an alarm signal can be indicated by means of the flasher circuit 110 or other such alarm indicating means which produce an audible and/or visual indication after a preset lapsed time interval has passed. In this manner, personnel at the central office can be alerted when a phone fault has existed for an abnormal period of time or, when the phone has not been used for an abnormal period of time, whichever occurred later.

The circuitry shown in the central office equipment can be powered by means of are rechargable battery, similar to that shown in the pay station equipment or by a non-rechargable battery. Additionally, for the central office unit, power can be supplied from a regulated power supply mounted in the equipment console or from the central office battery system.

Utilizing the equipment shown in FIGS. 1 and 2, the detector at the pay telephone station can directly measure the impedance of the transmitter and receiver elements in the handset of the phone unit and set off an alarm if the impedance of either or both elements depart from a normal predetermined value. In addition, the detection circuit monitors more generally the function of the pay station phone by an indirect means. When the pay station customer lifts the handset off its cradle, the circuit in the pay station proper is turned ON. For most American telephone companies, a three-second interval is sufficient time for a dial tone to appear after a phone has been taken off its cradle. The detection circuitry senses the presence of the dial tone when it is received at the pay station. If the dial tone is not received within the three second time interval of a first timing circuit, an alarm tone is triggered and transmitted from the pay station to the central office. Failure of dial tone to appear within this three-second interval would indicate a malfunction and, therefore, the unit transmits an alarm signal. The three-second interval is, of course, somewhat arbitrary and for different operating conditions may be varied to decrease or increase the interval. The alarm signal is sent by a single oscillator circuit. However, multiple tones could be used to identify specific types of phone failure.

The second timer is set for a longer interval, in this case 10 seconds. If the receiver and transmitter units were normal when the phone is put in usee, and if dial tone arrives within the three-second interval, then nothing further happens unitl the customer deposits his coin and begins to dial his phone number. The instant he beings to dial, dial tone is broken by this action. The circuit within the phone has been waiting, so to speak, for dial tone to break. If the dial tone is not broken within the ten-second interval of the second timer, an alarm tone is generated and transmitted to the central office. Failure to break dial tone would be considered abnormal and possibly indicating a faulty coin mechanism or faulty components within the pay station electrical circuit or even possible failure of the dial mechanism itself. It is, of course, also possible that the customer simply took too long to either insert his coin or to begin dialing after insertion of the coin. For this reason, equipment at the central office is made to register failure in the sequential stages, or coded in terms of the number of failures reported. For example, the first reported failure of a pay station might be registered by the green indicator light. The second failure would produce the yellow indication, and a third successive failure would produce the red indication. If failure has been reported to the central office by the equipment, and subsequently a customer uses the telephone and completes a call normally, the central office equipment is automatically cleared of any fault registration.

The purpose of the system is to avoid false indications of malfunction, which might result from one customer using the telephone and being tardy in dialing his number. The probability, however, of several sequential usages of the telephone, each having the customer taking more than the preset ten-second interval to dial his number, is very low. Although three output indications are utilized, it is understood that this number is arbitrary and various other indications could be registered by the equipment at the central office.

Utilizing the detection equipment described, numerous failures can be determined. An equipment failure of the transmitter or receiver, such as might occur due to weathering conditions, corrosions, etc., of the coil in the receiver, or packing of the carbon in the microphone would cause the impedance or resistance of either of these two elements to change. This change could be detected by the circuit of the present invention and once detected triggers a fault alarm signal which is transmitted to the central office. Vandalism, such as when a customer takes the receiver off the hook and deliberately yanks the phone off the pay station, would then disconnect the receiver and transmitter connecting wires and would also cause a fault alarm to be transmitted. Additional types of vandalism, such as pouring soft drinks into the handset would also cause the resistance or impedance of the handset elements to change and would similarly produce an alarm. Removal of transmitter or receiver elements from the handset would also produce an alarm.

Failure of the dial tone to be received after the phone is lifted off its cradle also causes an alarm to be transmitted. Failure of the coin mechanism or other internal electrical parts of the phone and dial mechanism, which would prevent breaking of the dial tone, would also cause an alarm to be transmitted.

There are, of course, unlikely but possible failures which would not cause an alarm to be transmitted directly under the system. For example, if a customer took the phone off the cradle, dialed his number and then decided to vandalize the phone by pulling the handset from the telephone instrument and thereby disconnecting the cable. such fault would not be transmitted unless the phone were again used after it has been vandalized. However, it is unlikely that this would happen since the next customer who would arrive at the station would find no handset to lift off its cradle. Other deliberate damage to the phone, which would impair operation and be visible to a subsequent customer, might also prevent usage of the telephone and, therefore, the system would not report an alarm failure.

For this reason, the central office equipment is equipped with a clock timing means, which registers the time in hours since a phone was last normally used or since a fault was recorded on that particular phone, whichever occurred later. In this way, personnel at the central office can note any abnormal period of time where a pay station was not used. For example, if a phone were normally used several times an hour and it is noted that a single or green fault level had been registered at the central office, and in addition an accompanying time on the clock reads a large number of hours, one would expect that a serious fault had existed at this particular pay station. Probably, there would have been visible physical damage, because the phone had registered a fault and has not been subsequently used by other customers during the extended period such period being greater than that which would be considered normal for the particular pay station. For example, this would cover the case previously mentioned where the customer makes a normal phone call and then decided to pull off the handset.

In addition, if the phone had been damaged in some other way, such as the dial mechanism smashed, without removing the handset or taking the phone off its cradle, no fault would be recorded at the central office, but it would also be highly unlikely that the phone would be used. Again, the timer would monitor and register the time since the last normal call had been placed on that telephone, and a period in exccess of what would be considered normal would be indicative of a phone in trouble with possible physical damage.

At the central station, a console could be installed which serves a multiplicity of pay station monitoring units. For example, 50 or 100 or more can be included per rack in the console. Additionally, the console could contain other accessory equipment, such as means for reporting a pay station fault status to a remote site. This could be done by means of a sequential scanner which would monitor the status of each pay station unit and transmit the information serially over a telephone line to the remote site. Such equipment would be necessary for unmanned central office stations and would also be useful for central offices with remote trouble centers. The master panel of the central office equipment could also contain the basic clock time generator, as well as audio alarm signaling means, etc.

In addition to be above, there can also be incorporated as an optional accessory to the pay station fault alarm equipment, a coin box monitoring system. Alternately, it could be included as a separate device on the pay telephone station.

Figure 3:
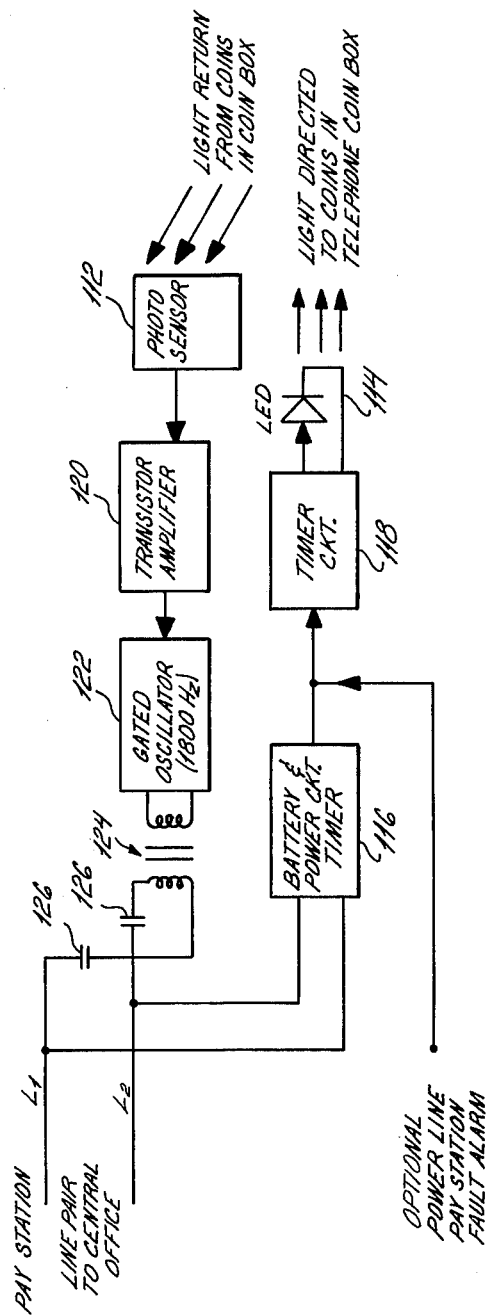
FIG. 3 is a circuit diagram of a further embodiment of the invention including a pay station coin box monitor showing the equipment to be attached at the pay telephone station.

At present, there is a significant problem existing with pay phones operating in heavy traffic areas. If the coin box becomes completely filled with coins, eventually the phone will not operate because the coin mechanism becomes jammed with coins. Not only does this cause a loss in revenue, but it frequently causes customer complaints. Referring now to FIG. 3, there is shown the circuitry to be attached at a pay station which provides a means for signaling to a central office when the coin box approaches full condition. The device includes a photoelectric solid state receiving element 112 and a light emitting diode 114. Such combination units are generally referred to as photosensor units and are readily available, as for example, the Model 700 and 703 manufactured by Optron Corporation. The photosensor unit containing both the light emitting diode 114 and the photoresponsive element 112 are mounted on the coin chute of the telephone in a position where there is a direct optical path into the coin box proper. Most coin telephones have an opening near the exit point of the coin chute or near the entrance to the coin box which is readily accessible for this purpose. If no such opening exists, then the chute must be drilled to provide a clear path for the photosensor unit.

When the handset is lifted off its cradle, a power circuit unit 116 provides power to the coin box monitor. Such circuit can be similar to the power circuit and timer 26, and the power source 28 heretofore described in connection with FIG. 1. The output of the battery and power circuit 116 feeds a timer circuit 118 which delivers a pulse of power to the light emitting diode 114 when powered up. The resultant light emitted from the light emitting diode 114 projects downward into the coin box. As the level of coins rises in the box, the distance from the surface of the coins to the photoresponsive unit 112 diminishes. The reflected light level therefore increases as the distance diminishes and, as the coins pile up in the coin box, the output of the photoresponsive device 112 correspondingly increases. The output signal form the photoresponsive device is a pulse signal which corresponds to the pulse of light emitted by the light emitting diode 114. The pulse is amplified by a transistor amplifier 120 or other similar amplifying means. The amplifier has a predetermined threshold level which is set so as to deliver a pulse when the signal from the photosensor 112 exceeds a preestablished level. In the example described, this threshold level was set to correspond to a level of coins approximately 3 inches distant from the opening in the coin chute where the unit is mounted. This would correspond to a coin box level of approximately 1 inch below a completely full condition. Of course, the height at which it is desired to trigger the alarm signal can be adjusted by a potentiometer included in the circuit such as within the transistor amplifier circuit 120.

When the signal exceeds the preset threshold, a pulse is delivered to a trigger circuit which is connected to an oscillator 122. This circuit can include an astable multivibrator connected to an oscillator generator. The circuit can also be provided with a timing means which causes the multivibrator to deliver a burst signal. The burst interval is somewhat arbitrary. In the example, a one second burst was used. At the end of the burst interval, the power circuit automatically turns off. The generated tone signal during the burst signal is sent across the transformer 124 onto the telephone lines 102 passing through the capacitors 126. This signal is then sent to the central station.

Referring back to FIG. 2, the tone signal generated by the coin box monitor is detected by the optional coin box monitor detector 128. This can be similar to the detector unit 80 heretofore described in connection with the other alarm signals. By making the frequency of the coin box alarm signal different from the other alarm signals, it will be insured that only the coin box monitor detector 128 will receive this alarm singla. For example, a signal of 1800 Hz was utilized to detect the coin box level. The output feeds an alarm latching driver circuit 130 which causes the light emitting diode 132 to remain ignited so long as the coin box has not been cleared.

Utilizing the coin box monitor described, each time the pay station is used the photosensor unit views the level of coins in the coin box. When this level exceeds a predetermined height, a one second alarm signal is generated at a frequency of 1800 Hz. Personnel at the central office can then detect when the indicator is lighted and can dispatch collectors to the pay station before the coin box becomes so overloaded as to make the phone inoperative. As with the pay station fault alarm system previously described, such information can be transmitted to a remote site for remote monitoring of numerous pay station coin boxes.

While various times and values have been given, it is understood that such are merely by way of example and numerous other intervals and values could be utilized in practice which would vary from those described.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a pay telephone station coupled to a central office through telephone lines, a fault alarm system comprising:
   detection circuit means connected at the pay telephone station for producing alarm signals upon the detection of malfunctions of the pay station equipment;
   monitor circuit means connected at the central office for receiving said alarm signals and producing output signals upon predetermined occurrences of said alarm signals; and
   a handset removable from a cradle to cause a dial tone to appear onto the line, and wherein said detection circuit means further comprises:
   timing means for timing the time interval from handset removal to the onset of dial tone and producing an alarm signal when the interval is greater than a predetermined amount.

2. A pay telephone station as in claim 1 including a dialer for entering numbers and breaking the dial tone.

3. A pay telephone station as in claim 1 and wherein said detection circuit means includes checking circuitry, and timing means for timing a predetermined interval commencing with the removal of the handset from the cradle and disconnecting the checking circuitry from said source of energy at the end of said interval.

4. A pay telephone station as in claim 1, and wherein said monitor circuit includes timing means for recording the interval of time since a pay telephone station had been previously used, and producing an output signal upon a predetermined interval being recorded and wherein said timing means commences recording the time interval in response to the later one of a first occurring alarm signal and a clear signal.

5. A pay telephone station as in claim 1, and wherein said monitor circuit includes sensing means for detecting that a pay telephone station has properly operated and in response thereto producing a reset signal, said reset signal clearing the previous output signals produced for that pay telephone station.

6. A fault detection system for a pay telephone station connected to a telephone line comprising detecting means for determining a malfunction of the pay station equipment, and alarm means responsive to said detecting means for producing an alarm signal indicating such malfunction, and wherein the pay telephone station equipment includes a handset having transmitter and receiver elements, and wherein said detecting means includes monitoring means for checking the proper values of the impedance of said transmitter and receiver elements.

7. A fault detecting system as in claim 6, and wherein said monitoring circuit comprises a bridge circuit, a first transformer means coupled to said transmitter element, and a second transformer means coupled to said receiver element, and a third transformer means coupled to the telephone line, said three transformer means being connected to said bridge circuit to produce a balanced condition when said transmitter and receiver elements are at their respective proper values of impedance, and producing an output signal when the impedance of one of said elements is altered.

8. A fault detection system as in claim 7, and wherein said monitor circuit further comprises a sensing means connected to said 1st and 2nd transformer means for detecting the amplitude and frequency of the dial tone signal as it appears at the output of said 1st and 2nd transformer means, and producing output signals when the impedance is altered.

9. A fault detection system as in claim 6, and wherein the pay telephone station equipment includes a handset removalbe from a cradle to cause a dial tone onto the telephone line, and wherein said detecting means further comprises timing means for determining when the interval of time from handset removal to the onset of dial tone is greater than a predetermined amount.

10. A fault detecting system as in claim 9, and wherein said timing means is set to count up to said predetermined amount, said timing means being activated by the removal of the handset from the cradle to commence timing, logic circuit means for controlling the operation of said alarm means, said timing means being connected to said logic circuit for activating said logic circit means to operate said alarm means at the end of said predetermined amount of time, and dial tone sensor means for detecting the occurrence of a dial tone on the line, said dial tone sensor means being coupled to said logic circuit means for inhibiting its activation by said timing means.

11. A fault detection system as in claim 6, and wherein the pay telephone station includes a handset removable from a cradle to cause a dial tone onto the line, and a dialer for entering numbers and breaking the dial tone, and wherein said detecting means further comprises timing means for determining when the interval from the onset of the dial tone to the breaking of the dial tone is greater than a predetermined amount of time.

12. A fault detection system as in claim 11, and further comprising dial tone sensor means for detecting the presence of dial tone on the line, said timing means being set to time up to said predetermined amount and coupled to the output of said dial tone sensor means for timing during the interval when dial tone is present on the line, and logic circuit means coupled between said timing means and said alarm means for operating said alarm means when said timing means reaches said predetermined amount of time.

13. A fault detection system as in claim 12, and further comprising dial tone memory circuit means coupled between said timing means and said logic circuit means for registering the occurrence of dial tone on the line and in response thereto, predisposing said logic circuit means to be operated by said timing means.

14. A fault detection system as in claim 6, and wherein the pay telephone station equipment includes a handset removable from a cradle for placing a call, and further comprising a source of energy, switching means activated by the removal of the handset from the cradle and interconnecting said detecting means with said source of energy, and timing means for timing a predetermined interval commencing with the removal of the handset from the cradle and for disconnecting the checking circitry from said source of energy at the end of said interval.

15. A fault monitor system connected at a telephone central office for monitoring the operation of a pay telephone station connected by the telephone lines to the central office and comprising:
   detecting means for detecting both the proper operation and the malfunction of the pay telephone station, and
   display means for producing output signals upon predetermined occurrences of various malfunctions of the pay telephone station, and
   wherein said central station receives a dial tone signal from the telephone pay station when a call is placed thereon and an alarm signal when a malfunction occurs thereon, and
   wherein said detecting means comprises dial tone detection means for detecting said dial tone signal, first time means activated by said dial tone detection means for producing a reset signal when a first predetermined time interval is reached, alarm signal detection means for detecting said alarm signal, second timer means activated by said alarm signal detection means for producing a reset inhibit signal and a clock signal when a second predetermined time interval is reached, said clock signal, reset signal and reset inhibit signal being applied to said display means.

16. A fault monitor system as in claim 15, and wherein said display means includes counter means for counting said clock pulses and being reset by said reset signal.

17. A fault monitor system as in claim 16, and wherein said display means further includes visual indicating means coupled to the output of said counter means for indicating the count in said counter means.

18. A fault monitor system as in claim 17, and wherein said display means further includes latching means for maintaining a fixed output display after a predetermined count is reached.

19. A fault monitor system as in claim 17, and wherein said visual indicating means includes a plurality of light emitting diodes each capable of emitting light of a different color, and wherein each color represents a particular count.

20. A fault monitor system as in claim 15, and wherein said second interval is greater than said first interval.

21. A fault monitor system as in claim 20, and further comprising third timer means activated by said reset signal for counting a third predetermined time interval and inhibiting the operation of said first and second timer means during said third predetermined time interval.

22. A fault monitor system as in claim 16, and further comprising fourth timer means reset at each occurrence of both said reset signal and a first count on said counting means for counting a fourth predetermined time interval and producing an output warning signal at reaching said fourth predetermined time interval.

23. A fault monitor system as in claim 22, and further comprising a time display unit coupled to said fourth timer means for displaying the time counted by said fourth timer means.

24. A coin box monitor for a pay telephone station connected to a telephone line comprising:
   detecting means for detecting the height of the coins in the coin box, and
   alarm means responsive to said detecting means for producing an alarm signal indicating a predetermined height being reached, and
   wherein said pay telephone station has a coin box and a coin chute leading into the coin box, and
   wherein said detecting means includes a light emitting device located at the coin chute for directing light to the coins located in the coin box,
   a light responsive device located at the coin chute for receiving light reflected from the coins in the coin box, and
   a level detector coupled to said light responsive device for detecting when a predetermined amount of relfected light is received.

25. A coin box monitor as in claim 24, and wherein said alarm means comprises an oscillator means coupled between said level detector and the telephone line for generating a signal onto the telephone line when said predetermined amount of reflected light is received, said signal being of a frequency not interferring with the operation of the telephone equipment.

26. A coin box monitor as in claim 24, and wherein said pay telephone station includes a handset removable from a cradle to energize the station, and wherein said detecting means further includes a trigger circuit energized by the removal of the handset from the cradle for producing a pulse to activate said light emitting device.

27. A coin box monitor as in claim 24, and wherein said pay telephone station is connected to a central office by means of the telephone line, and wherein said central office includes monitor circuit means responsive to said alarm signal, and visual indicating means coupled to said monitor circuit means for providing a visual indication of a full or near-full coin box.

* * * * *